Sept. 8, 1931.  F. C. WILSON  1,822,685

CHUCK

Filed July 15, 1929

Inventor
Frank C. Wilson
By Popp and Powers
Attorney

Patented Sept. 8, 1931

1,822,685

UNITED STATES PATENT OFFICE

FRANK C. WILSON, OF ARCADE, NEW YORK

CHUCK

Application filed July 15, 1929. Serial No. 378,345.

This invention relates to a chuck which is especially adapted for use in the grinding of valves.

Heretofore chucks have been provided for this purpose which consist essentially of a tubular body having slots alternately extending from opposite sides of the body, said slots permitting the radial movement of the end portions of the body member to grip the valve stem, the gripping portions of the body member being restored to their original positions after use by the inherent resiliency of the tubular member. This type of chuck is expensive, however, first because of the fact that it must be made from high grade steel, and secondly because even though made of high grade steel, the tubular body becomes warped after short usage and will not permit accurate alignment of the valve stem in the chuck.

The principal object of the invention is to overcome the above disadvantages.

Another object is to provide a chuck which can be inexpensively manufactured and which will over a long period of use uniformly engage the valve stems to accurately align the same in the chuck to assure the proper grinding of the valve faces during the rotation of the chuck.

The invention consists generally in novel features of structure and combination appertaining to a chuck having independent radially movable jaw members, each of which is adapted to grip the stem of the valve at points substantially distant from one another.

The invention is illustrated in the accompanying drawings in which.

Figure 1:
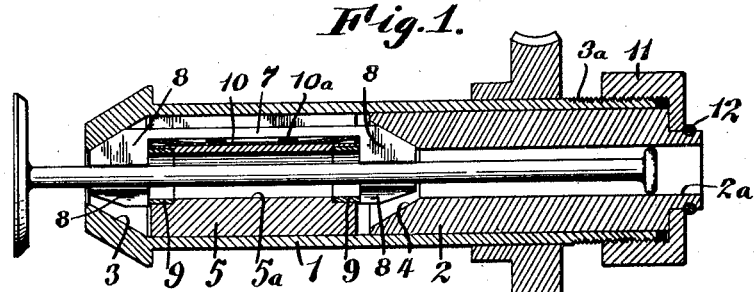
Figure 1 is a longitudinal section of the chuck with a valve positioned therein.

The chuck includes a cylindrical casing 1 which may be rotated in any suitable manner as by a gear G which is fixed thereto. The casing is tapered at one end to provide an internal conical face 3 and is externally threaded at its opposite end as at 3a. A follower block 2 having a bore 2a is mounted within the casing 1 and is provided with a conical face 4 similar to the conical face 3 at the end of the casing but opposed thereto.

Associated with the follower block 2 and in the forward end of the casing 1 is a body member 5 having a bore 5a, which member is provided with longitudinal grooves 6 in which jaw members 7 are movably mounted. The jaw members 7 have lateral extensions at their ends providing gripping portions 8, the said gripping portions being beveled as at 8a to provide camming surfaces to cooperate with the opposed conical faces of the casing and follower.

In order to prevent the wearing away of the ends of the thin bottom walls of the grooves by the inward and outward movement of the jaw members, bushings 9, preferably of hardened steel, are fitted in the bore of the body member at each end thereof, the bushings preferably extending slightly beyond the ends of the body member. The jaw members 7 are radially adjustable in the grooves 6 with respect to the body member 5 and the jaw portions 8 are adapted for frictional engagement with the stem of the valve to be ground, the bores 5a and 2a of the body member 5 and follower 2 respectively being sufficiently large to permit the passage of the valve stem therethrough. The jaw members 7 are urged outwardly by springs 10 which are positioned in the grooves 6 beneath the jaw members, the said spring members being retained in the grooves 6 by resilient leaf members 10a of slightly greater length than the width of the grooves thereby permitting the wedging of the leaf members in the grooves upon the spring members.

Figure 2:
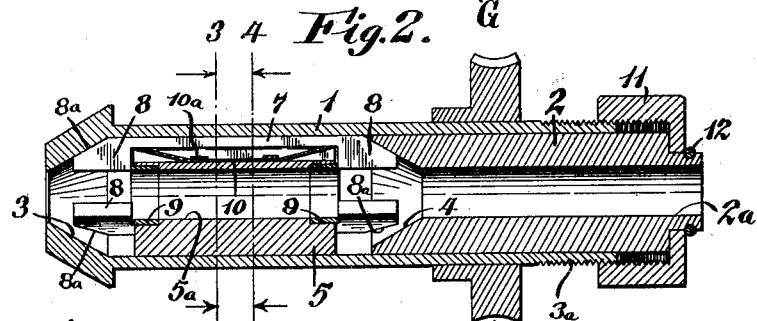
Figure 2 is a similar view with the jaws in an inoperative position and ready to receive the stem of a valve.
Figure 3:
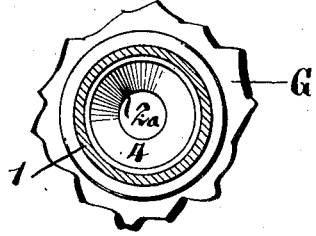
Figure 3 is a section on the line 3—3 of Fig. 2.
Figure 4:
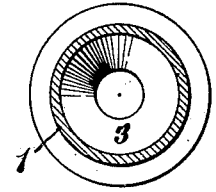
Figure 4 is a section on the line 4—4 of Fig. 2.
Figure 5:
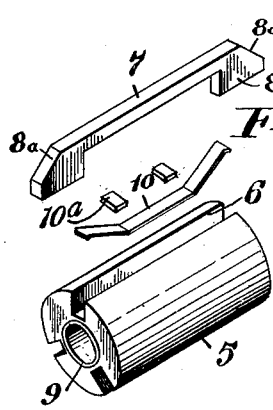
Figure 5 is an exploded view of the chuck body and jaw and spring members therefor.

A cap 11 is loosely mounted upon the reduced outer end of the follower 2 and retained thereon by a locking ring 12 which is seated in a suitable groove in the reduced portion of the follower. When the cap 11 is turned to force the follower 2 inwardly, the opposed conical faces 3 and 4 engage the cooperating beveled faces 8a on the ends of the jaw portions 8 to force the same inwardly against the resistance of the springs 10 until their faces firmly grip the stem of the valve, at which time the face of the valve may be rotated against a suitable grinding surface by the rotation of the chuck through the gear G. To release the valve, the cap 11 is turned to withdraw the follower from the casing during which operation, the jaws 8 under influence of the springs 10, reach their extreme outward positions as shown in Figure 2, in which positions the valve may be readily withdrawn from the chuck.

Figure 6:
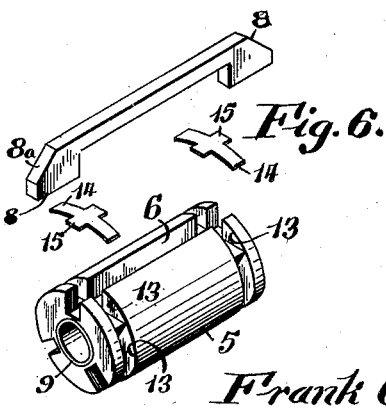
Figure 6 is a similar view showing a modified form of the chuck body and spring members.

A modified form of the invention is shown in Figure 6 in which the body member 5 is also provided with transverse grooves 13 adjacent its ends which are utilized in conjunction with the longitudinal grooves 6 to form seats for the springs 14. The springs 14 have lateral projections 15 which fit in the longitudinal grooves to insure the correct positioning of the springs beneath the jaw members 7, which projections also prevent transverse displacement of the springs. In this form of construction, two such springs 14 are preferably used in place of the single spring 10.

Having fully described my invention, I claim:

1. A chuck comprising a body member having circumferentially spaced grooves and a central bore, wearing rings mounted at the ends of said bore and extending slightly beyond the ends of said body member, jaw members movably mounted in said spaced grooves, said jaw members having central reduced portions providing laterally projecting gripping members the inner edges of which slidably engage the end extensions of said wearing rings, a casing enclosing said body member, a follower within said casing and engaging said jaw members, means carried by said casing and engaging said follower to move said follower inwardly whereby to effect radial movement of said gripping members toward the axis of said body member.

2. A chuck comprising a body member having circumferentially spaced grooves, said member having a central bore, wearing rings mounted at the ends of said bore, jaw members mounted for radial body movement in said spaced grooves, said jaw members having central reduced portions providing laterally projecting gripping members the inner edges of which slidably engage said rings, a casing enclosing said body member, a follower within said casing and engaging said jaw members, means carried by said casing and engaging said follower to move said follower inwardly whereby to effect radial movement of the jaw members toward the axis of said body member.

3. A chuck comprising a body member having longitudinal and transverse grooves, spring members seated in said transverse grooves, jaw members having beveled ends mounted for radial body movement in said longitudinal grooves and upon said spring members, a casing enclosing said body member and capable of axial movement thereon one end of said casing being tapered to provide a camming surface adapted to cooperate with the beveled ends of said jaw members, a follower within said casing and engaging said jaw members and means carried by said casing and engaging the follower for moving said follower inwardly thereby to effect radial movement of said jaw members toward the axis of said body member against the action of said spring members.

4. A chuck comprising a body member having longitudinal and transverse grooves, spring members seated in said transverse grooves, jaw members mounted for radial body movement in said longitudinal grooves and engaging said spring members, a casing enclosing said body member and capable of axial movement thereon, a follower within said casing and engaging said jaw members, and means carried by said casing and engaging said follower for moving said follower inwardly whereby to effect radial movement of said jaw members toward the axis of said body member against the action of said spring members.

5. A chuck comprising a body member having longitudinal and transverse grooves, spring members in said transverse grooves, jaw members having beveled ends mounted for radial body movement in said longitudinal grooves and upon said spring members, a casing enclosing said body member and capable of axial movement thereon, a follower within said casing, said follower and said casing having opposed conical faces adapted to cooperate with the opposed beveled ends of said jaw members to effect radial movement of said jaw members toward the axis of said body member against the action of said springs upon inward movement of said follower.

6. A chuck comprising a body member, said member having longitudinal and transverse grooves, spring members seated in said transverse grooves and having lateral projections engaging said longitudinal grooves, jaw members mounted for radial body movement in said longitudinal grooves upon said spring members, a casing enclosing said body member and capable of axial movement thereon, a follower in said casing and engaging said jaw members and means carried by said casing and engaging the follower for moving said follower inwardly whereby to effect radial movement of said jaw members toward the axis of said body member against the action of said spring members.

In testimony whereof I affix my signature.

FRANK C. WILSON.